(12) United States Patent
Lin et al.

(10) Patent No.: US 11,898,371 B2
(45) Date of Patent: Feb. 13, 2024

(54) TAMPER ALARM FOR ELECTRONIC LOCK

(71) Applicant: ASSA ABLOY Americas Residential Inc., New Haven, CT (US)

(72) Inventors: James Lin, Laguna Niguel, CA (US); Matthew Lovett, Lake Forest, CA (US)

(73) Assignee: ASSA ABLOY Americas Residential Inc., New Haven, CT (US)

( * ) Notice: Subject to any disclaimer, the term of this patent is extended or adjusted under 35 U.S.C. 154(b) by 0 days.

(21) Appl. No.: 17/508,454

(22) Filed: Oct. 22, 2021

(65) Prior Publication Data

US 2022/0228399 A1 Jul. 21, 2022

Related U.S. Application Data

(63) Continuation of application No. 16/425,491, filed on May 29, 2019, now Pat. No. 11,156,020.

(60) Provisional application No. 62/677,499, filed on May 29, 2018.

(51) Int. Cl.
| | |
|---|---|
| *G08B 21/00* | (2006.01) |
| *E05B 45/06* | (2006.01) |
| *G07C 9/00* | (2020.01) |
| *G08B 13/06* | (2006.01) |
| *E05B 47/00* | (2006.01) |
| *H04L 67/10* | (2022.01) |

(52) U.S. Cl.
CPC .......... *E05B 45/06* (2013.01); *E05B 47/0001* (2013.01); *G07C 9/00571* (2013.01); *G08B 13/06* (2013.01); *H04L 67/10* (2013.01)

(58) Field of Classification Search
CPC ................. E05B 45/06; E05B 47/0001; E05B 2047/0095; G07C 9/00571; G07C 9/0069; G07C 2209/62; G08B 13/06; H04L 67/10; H04L 67/12
USPC .................................................. 340/266, 416
See application file for complete search history.

(56) References Cited

U.S. PATENT DOCUMENTS

| | | | |
|---|---|---|---|
| 6,016,677 A * | 1/2000 | Clark .................. | E05B 47/0012 70/333 R |
| 7,388,484 B2 | 6/2008 | Hsu | |
| 9,024,759 B2 | 5/2015 | Uyeda et al. | |
| 9,424,700 B2 | 8/2016 | Ovett et al. | |
| 9,980,020 B1 * | 5/2018 | Sharp ................. | G07C 9/00174 |
| 2006/0224898 A1 * | 10/2006 | Ahmed .................... | G06F 21/36 713/186 |
| 2014/0247113 A1 | 9/2014 | Paquin | |
| 2014/0267740 A1 | 9/2014 | Almomani et al. | |
| 2014/0368345 A1 * | 12/2014 | Dobbins ................ | G08B 13/02 340/5.28 |

(Continued)

*Primary Examiner* — Mark S Rushing
(74) *Attorney, Agent, or Firm* — Merchant & Gould, P.C.

(57) ABSTRACT

An electronic lock includes a latch assembly that includes a bolt that is movable between an extended position and a retracted position. The electronic lock includes a keypad for receiving a keypad input event. The electronic lock includes a processing unit being configured to control the movement of the bolt between the extended position and the retracted position responsive to receiving a valid keypad input event. The processing unit is configured to capture the keypad input event. Based at least in part on a characteristic of the keypad input event, the processing unit indicates if a tampering event exists. The characteristic includes at least one of an input location on the keypad, an input duration on the keypad, and an input timestamp.

20 Claims, 12 Drawing Sheets

(56) References Cited

U.S. PATENT DOCUMENTS

| | | |
|---|---|---|
| 2015/0097958 A1 | 4/2015 | Fadell et al. |
| 2015/0254917 A1* | 9/2015 | Rockermann ...... G07C 9/00309 340/5.7 |
| 2015/0330109 A1* | 11/2015 | Tepper .................. G05B 15/02 700/237 |

* cited by examiner

TAMPER ALARM FOR ELECTRONIC LOCK

CROSS-REFERENCE TO RELATED APPLICATIONS

The present application is a continuation of U.S. patent Ser. No. 16/425,491, filed May 29, 2019, now U.S. Pat. No. 11,156,020; which claims priority from U.S. Provisional Patent Application No. 62/677,499, filed on May 29, 2018, the disclosures of which are hereby incorporated by reference in their entireties.

BACKGROUND

Electronic locks have gained increasing acceptance and widespread use in residential and commercial markets. These locksets control ingress through doors in a building by requiring certain credentials. For example, these locksets typically include a control circuit that determines whether to unlock the lockset based on credentials provided by the user. In some cases, the credentials and/or commands may be provided to the lockset via a keypad.

Unauthorized tampering with the electronic lock can indicate a potential break-in or the existence of an unauthorized individual proximate to the electronic lock. However, oftentimes the electronic lock owner is notified of this tampering after the fact or not at all. Therefore, improvements in electronic lock design are desired.

SUMMARY

The present disclosure relates generally to electronic locks. In one possible configuration, and by non-limiting example, based at least in part on a characteristic of a keypad input event received at a keypad, the processing unit of the electronic lock indicates if a tampering event exists.

In one example of the present disclosure, an electronic lock is disclosed. The electronic lock includes a latch assembly that includes a bolt that is movable between an extended position and a retracted position. The electronic lock includes a keypad for receiving a keypad input event. The electronic lock includes a processing unit being configured to control the movement of the bolt between the extended position and the retracted position responsive to receiving a valid keypad input event. The processing unit is configured to capture the keypad input event. Based at least in part on a characteristic of the keypad input event, the processing unit indicates if a tampering event exists. The characteristic includes at least one of an input location on the keypad, an input duration on the keypad, and an input timestamp.

In another example of the present disclosure, a method of operating an electronic lock is disclosed. The method includes receiving a keypad input event via a keypad. Upon receipt of a valid keypad input event, a bolt is moved between an extended position and a retracted position. The method includes determining the existence of a tampering event based at least in part on a characteristic of the keypad input event. The characteristic includes at least one of an input location on the keypad, input duration on the keypad, and an input timestamp. The method includes activating a tamper alarm after it is determined a tampering event exists.

In a further example, an electronic lock includes a latch assembly including a bolt movable between an extended position and a retracted position, and an exterior assembly including a tamper sensing device, such as a capacitance or resistance sensor. The electronic lock includes a processing unit configured to control the movement of the bolt between the extended position and the retracted position responsive to receiving a valid input at the user input device; wherein the processing unit is configured to capture the input event. Based at least in part on a characteristic of the input event, the processing unit indicates if a tampering event exists, wherein the characteristic includes at least one of an input type, an input location, an input duration, and an input timestamp on the tamper sensing device.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
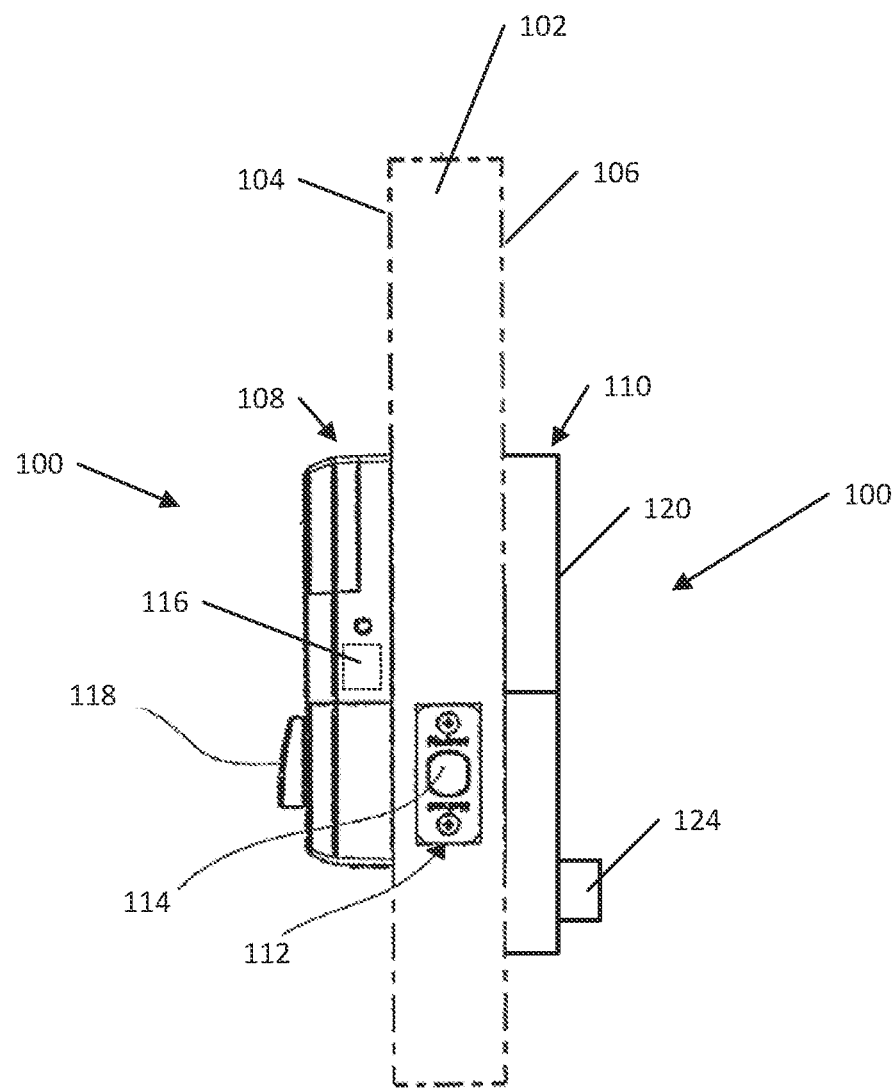
FIG. 1 illustrates a schematic side view of an electronic lock, according to one example of the present disclosure.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The electronic lock disclosed herein includes a number of advantages. The electronic lock is configured to provide an indication of tampering with an electronic lock, including tampering with a keypad of the electronic lock, in the form of, for example, a tamper alarm. The electronic lock can recognize when someone is physically tampering with the keypad (i.e., physically drilling into the electronic lock or keypad, or using other measures to physically manipulate the keypad). The electronic lock can also recognize when someone is trying to input an access code but does so inaccurately (i.e., depresses buttons adjacent to the correct button), provides too long of an input on the keypad, and/or attempts to input an access code outside of a normal window of operation of the electronic lock.

In some examples, an electronic lock can capture a keypad input event, for example, a user inputting an access code on the keypad, and determine if a tampering event exists based at least in part on characteristics of the keypad input event. The electronic lock can utilize characteristics of the keypad input event that include at least one of an input location on the keypad, an input duration on the keypad, and an input timestamp. In some examples, the electronic lock determines if a tampering event exists by comparing the keypad input event to past keypad input events and, if the keypad input event does not closely enough match past keypad input events, the electronic lock will trigger a tamper alarm.

In still other aspects, a tampering event can be determined based on the electronic lock detecting other types of interaction with the lock that may be identifiable as tampering. For example, physical tampering activities, such as drilling through or removing an escutcheon or face plate of an electronic lock, may indicate a tampering event to a circuit of the electronic lock, e.g., based on a sensor detecting the tampering event or based on a change in electrical characteristic of an aspect of the electronic lock. Still further, a tampering event may be detectable based on an unauthorized device attempting to connect to that electronic lock to actuate the lock. Accordingly, a tampering event may be detected based on either a keypad input event, a physical tampering event, or a connection attempt causing a tamper alarm to be triggered.

This disclosure generally relates to an electromechanical lock with certain features. The term "electronic lock" is broadly intended to include any type of lockset that uses electrical power in some manner, including but not limited to, electronic deadbolts, electronic lever sets, etc. This disclosure encompasses the integration of one or more features described herein into any type of electronic lock and is not intended to be limited to any particular type of electronic lock.

Figure 2:
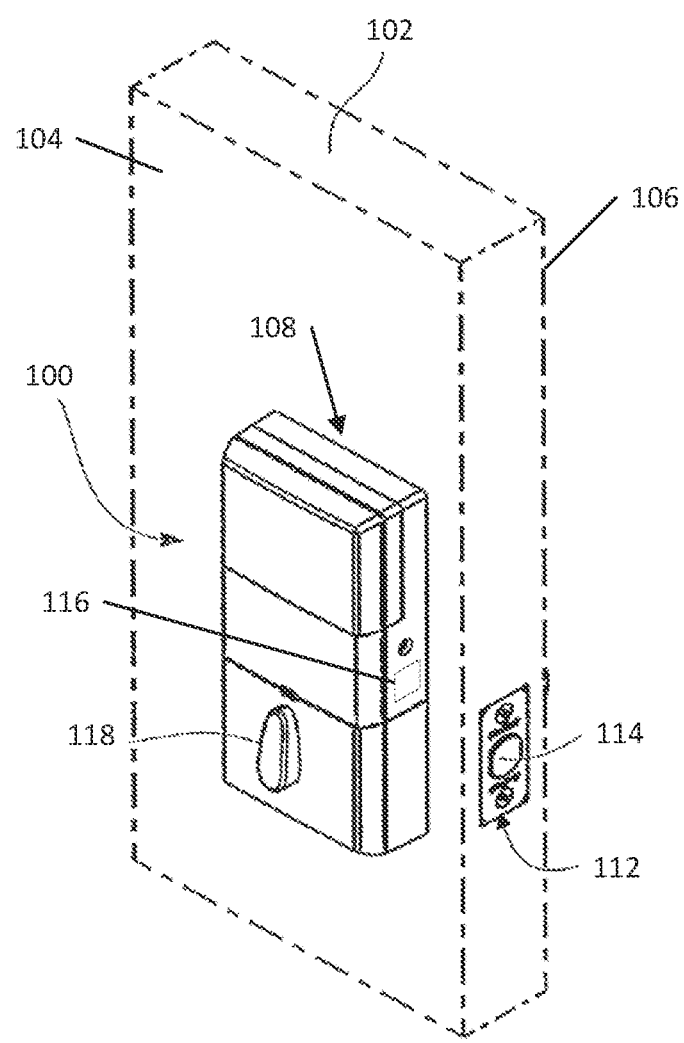
FIG. 2 illustrates a rear perspective view of a portion of the electronic lock of FIG. 1.
Figure 3:
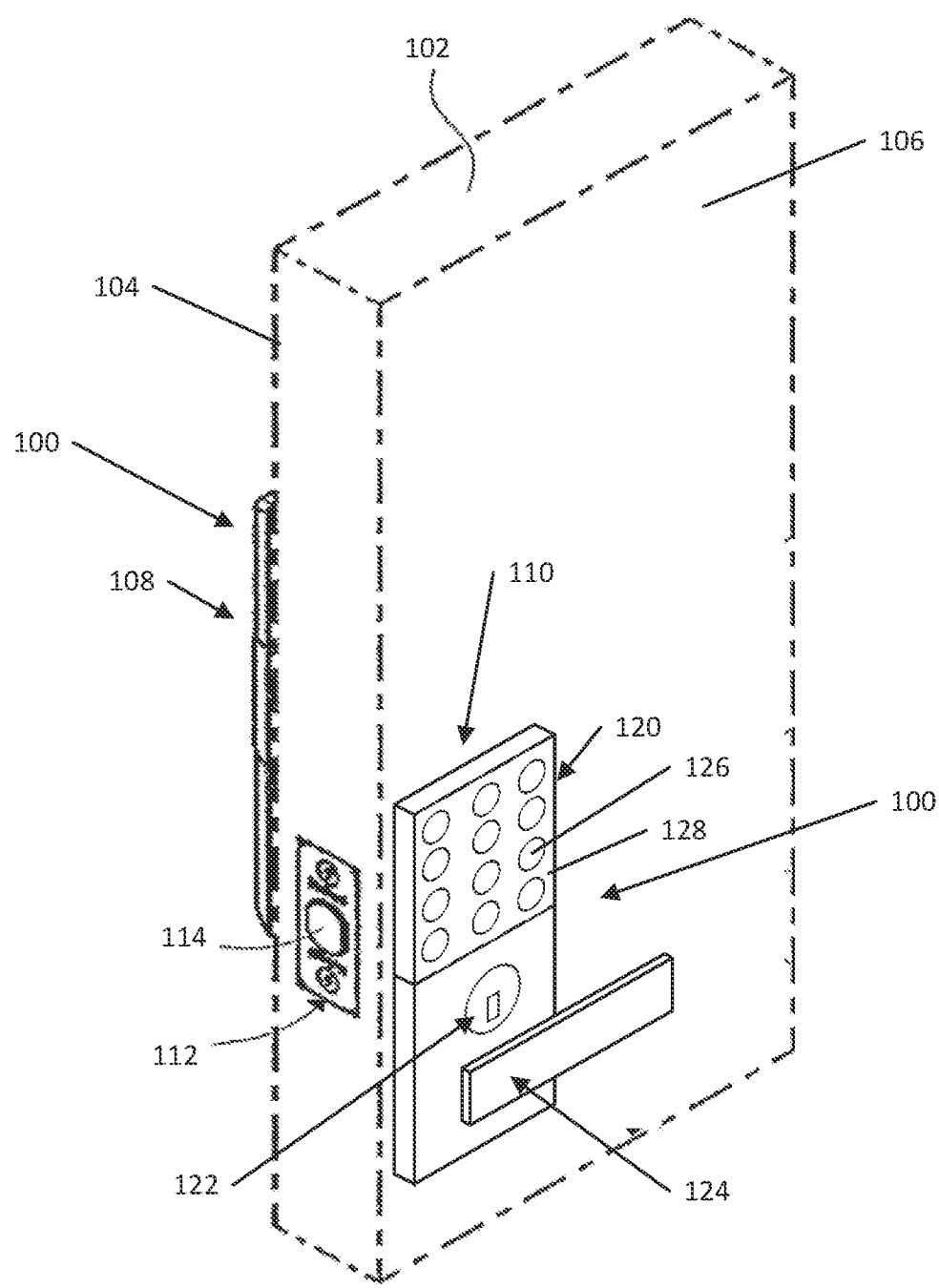
FIG. 3 illustrates a front perspective view of a portion of the electronic lock of FIG. 1.

FIGS. 1-3 illustrate an electronic lock 100 mounted to a door 102, according to one example of the present disclosure. The door has an interior side 104 and an exterior side 106. The electronic lock 100 includes an interior assembly 108, an exterior assembly 110, and a latch assembly 112. The latch assembly 112 is shown to include a bolt 114 that is movable between an extended position (locked) and a retracted position (unlocked, shown in FIGS. 1-3). Specifically, the bolt 114 is configured to slide longitudinally and, when the bolt 114 is retracted, the door 102 is in an unlocked state. When the bolt 114 is extended, the bolt 114 protrudes from the door 102 into a door jamb (not shown) to place the door in a locked state.

In some examples, the interior assembly 108 is mounted to the interior side 104 of the door 102, and the exterior assembly 110 is mounted to the exterior side 106 of the door 102. The latch assembly 112 is typically at least partially mounted in a bore formed in the door 102. The term "outside" is broadly used to mean an area outside the door 102 and "inside" is also broadly used to denote an area inside the door 102. With an exterior entry door, for example, the exterior assembly 110 may be mounted outside a building, while the interior assembly 108 may be mounted inside a building. With an interior door, the exterior assembly 110 may be mounted inside a building, but outside a room secured by the lock 100, and the interior assembly 108 may be mounted inside the secured room. The lock 100 is applicable to both interior and exterior doors.

Referring to FIG. 2, the interior assembly 108 can include a processing unit 116 (shown schematically) containing electronic circuitry for the electronic lock 100. In some examples, the interior assembly 108 includes a manual turnpiece 118 that can be used on the interior side 104 of door 102 to move the bolt 114 between the extended and retracted positions.

The processing unit 116 is operable to execute a plurality of software instructions (i.e., firmware) that, when executed by the processing unit 116, cause the electronic lock 100 to implement the methods and otherwise operate and have functionality as described herein. The processing unit 116 may comprise a device commonly referred to as a microprocessor, central processing unit (CPU), digital signal processor (DSP), or other similar device and may be embodied as a standalone unit or as a device shared with components of the electronic lock 100. The processing unit 116 may include memory for storing the software instructions, or the electronic lock 100 may further comprise a separate memory device for storing the software instructions that is electrically connected to the processing unit 116 for the bi-directional communication of the instructions, data, and signals therebetween.

Referring to FIG. 3, the exterior assembly 110 can include a keypad 120 for receiving a user input and/or a keyway 122 for receiving a key (not shown). The exterior side 106 of the door 102 can also include a handle 124. In some examples, the exterior assembly 110 includes the keypad 120 and not the keyway 122. In some examples, the exterior assembly 110 includes the keyway 122 and not the keypad 120. In some examples, the exterior assembly 110 includes the keyway 122 and the keypad 120. When a valid key is inserted into the keyway 122, the valid key can move the bolt 114 between the extended and retracted positions. When a user inputs a valid code into the keypad 120, the bolt 114 is moved between the extended and retracted positions.

In some examples, the exterior assembly 110 is electrically connected to the interior assembly 108. Specifically, the keypad 120, and associated exterior electronic circuitry 117, is electrically connected to the interior assembly 108, specifically to the processing unit 116, by, for example, an electrical cable 115 that passes through the door 102. The electrical connection between the exterior assembly 110 and the interior assembly 108 allows the processing unit 116 to communicate with other features included in the exterior assembly 110. When the user inputs a valid code via keypad 120 that is recognized by the processing unit 116, an electrical motor is energized to retract the bolt 114 of latch assembly 112, thus permitting door 102 to be opened from a closed position.

The keypad 120 can be used to initiate a process to lock/unlock the lock and/or otherwise provide input. The keypad 120 can be any of a variety of different types of keypads. The keypad 120 can be one of a numeric keypad, an alpha keypad, and/or an alphanumeric keypad. The keypad 120 can have a plurality of characters 126 displayed thereon. For example, the keypad 120 can include a plurality of buttons that can be mechanically actuated by the user (e.g., physically pressed). In some examples, the keypad 120 includes a touch interface 128, such as a touch screen or a touch keypad, for receiving a user input. The touch interface 128 is configured to detect a user's "press of a button" by contact without the need for pressure or mechanical actuation. An example of the touch interface is described in U.S. Pat. No. 9,424,700 for an "ELECTRONIC LOCK HAVING USAGE AND WEAR LEVELING OF A TOUCH SURFACE THROUGH RANDOMIZED CODE ENTRY," which is hereby incorporated by reference in its entirety.

In a further example embodiment, the electronic lock 100 includes other types of touch activation capability. In some embodiments, for example, the entire outside cover of the lock is touch sensitive and allows a user to touch the lock to activate various functions of the lockset.

In some examples, the electronic lock 100 can wirelessly communicate with external devices through a desired wireless communications protocol. In some examples, an external device can wirelessly control the operation of the electronic lock 100, such as operation of the bolt 114. The electronic lock 100 can utilize wireless protocols including, but not limited to, the IEEE 802.11 standard (Wi-Fi), the IEEE 802.15.4 standard (Zigbee and Z-wave), the IEEE 802.15.1 standard (Bluetooth®), a cellular network, a wireless local area network, near-field communication protocol, and/or other network protocols. In some examples, the electronic lock 100 can wirelessly communicate with networked and/or distributed computing systems, such as may be present in a cloud-computing environment.

Figure 4:
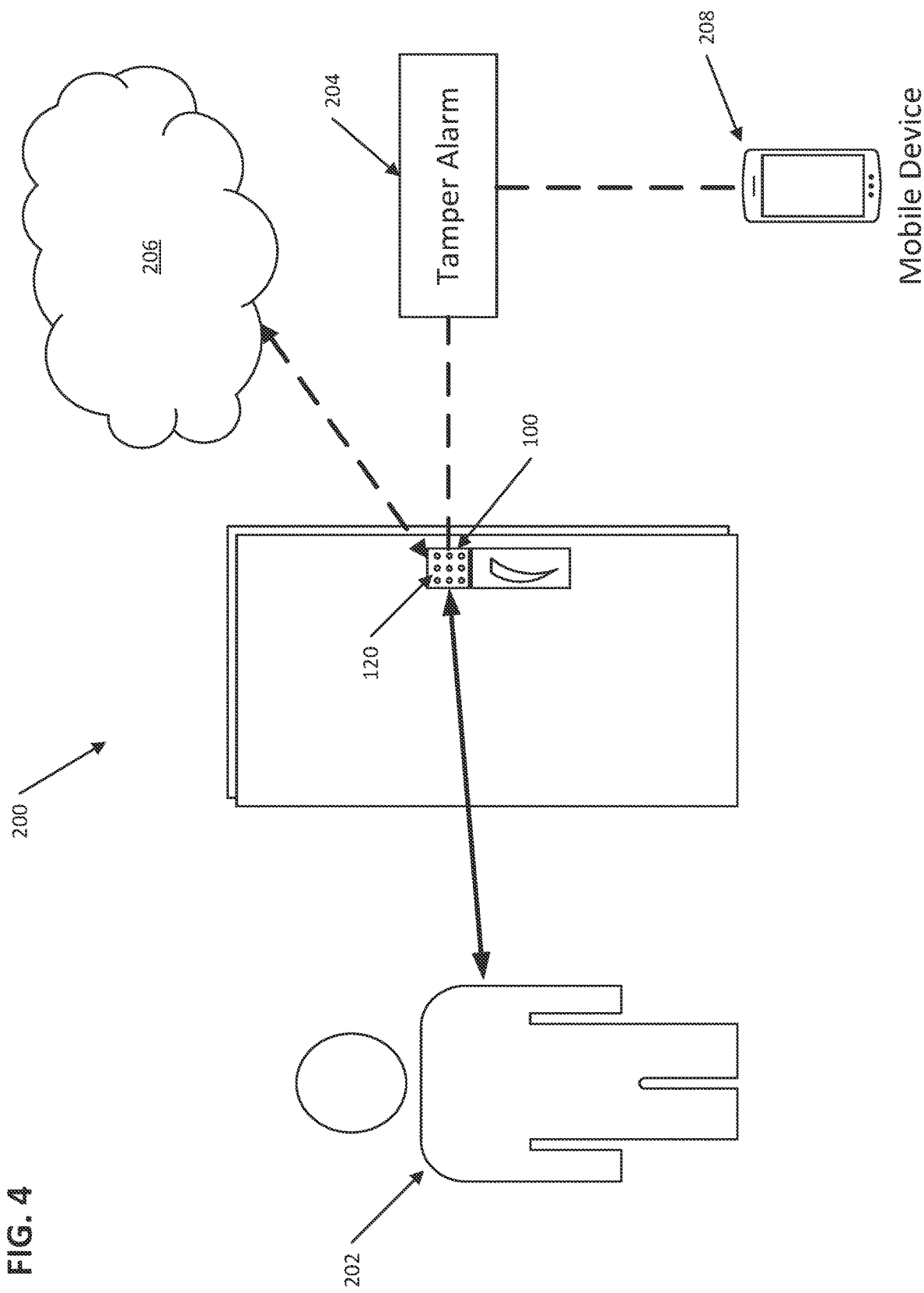
FIG. 4 illustrates a schematic representation of an example system utilizing the electronic lock of FIG. 1.

FIG. 4 shows a schematic of an example system 200 utilizing the electronic lock 100. As shown, a user 202 interacts with the electronic lock 100, specifically the keypad 120, to provide the electronic lock 100 with a keypad input event. The keypad input event occurs when the user 202 interacts with the keypad 120. This interaction can include, but is not limited to, touching a single character 126 of the keypad 120, touching a plurality of characters 126 of the keypad 120, placing a drill bit on the keypad 120, striking the keypad 120 with an object, and/or any other physical interaction with the keypad 120. In some examples, the keypad input event can include the user 202 entering an access code into the keypad 120. The access code can include a variety of different combinations of characters 126. In some examples, the access code is a four digit numeric passcode. In some examples, electrical signals are generated by the keypad 120 during a keypad input event. In some examples, the electrical signals are generated upon contact with the touch interface 128. In some examples, the electrical signals can represent a change in electrical capacitance and/or signals from an open to closed circuit, etc.

The electronic lock 100 is configured to analyze the keypad input event received at the keypad 120 and output a tamper alarm 204 if it is determined that the keypad input event has characteristics that are indicative of a tampering event.

A tampering event can occur when an unauthorized user attempts to gain access through the door 102 by way of tampering with the electronic lock 100. A tampering event can include, but is not limited to, the unauthorized user attempting to enter the valid access code, using brute force on the electronic lock, electronically compromising the electronic lock (hacking), and/or any other action that is not aligned with normal authorized user's use of the electronic lock.

In some examples, the electronic lock 100 determines if a tampering event exists using the electronic circuitry of the electronic lock 100, such as the processing unit 116. In some examples, the processing unit 116 uses past keypad input events from the electronic lock 100 to determine the existence of a tampering event.

In other examples, the determination of a tampering event may occur over a distributed system 206 (e.g., a cloud-based computing system), where memory, data storage and retrieval, and various processing functions may be operated remotely from each other over a distributed computing network, such as the Internet or an intranet. In some examples, the distributed system 206 aggregates keypad input events (from a single user or a plurality of users) and performs machine learning to determine the existence of tampering events. In some examples, the distributed system 206 then communicates the possibility of a tampering event with the electronic lock 100 (e.g., the processing unit 116) so the electronic lock 100 can output the tamper alarm 204.

The tamper alarm 204 can be in the form of a notification that indicates to the user 202 that a tampering event has taken place. In some examples, the tamper alarm 204 can be a visual and/or audio notification. In some examples, the tamper alarm 204 can be indicated on the electronic lock 100 itself, such as by a status light and/or an audible message on, or from, the interior or exterior assemblies 108, 110. In some examples, the tamper alarm 204 can be output to a remote device, such as a mobile device 208 and appear as a notification on a display. In some examples, the tamper alarm 204 can be in the form of a notification in an application of the mobile device 208. In other examples, the tamper alarm 204 can trigger the electronic lock 100 to perform secondary functions such as, disabling the operation of the electronic lock 100, specifically the keypad 120.

Figure 5:
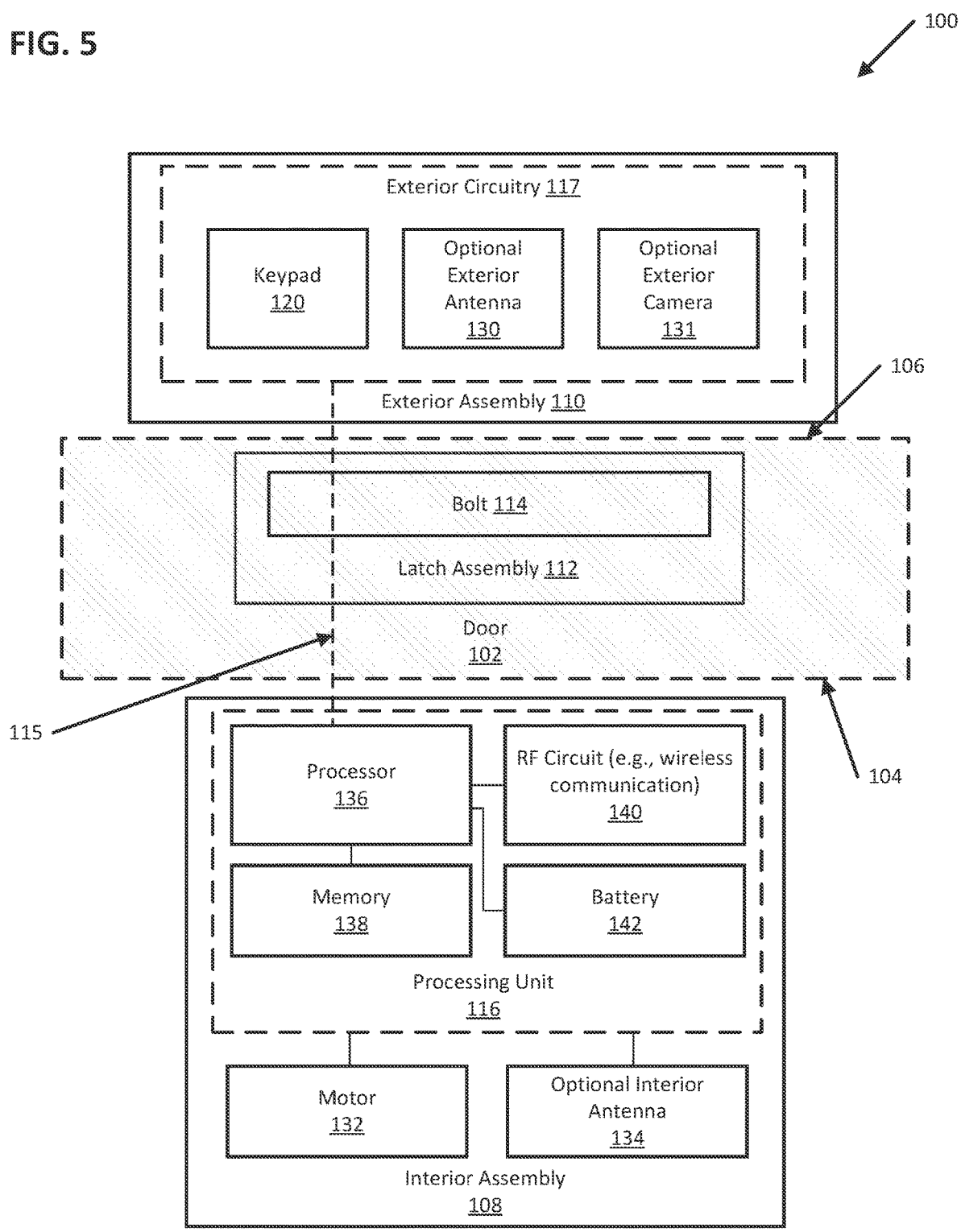
FIG. 5 illustrates a schematic representation of the electronic lock of FIG. 1.

FIG. 5 is a schematic representation of the electronic lock 100 mounted to the door 102. The interior assembly 108, the exterior assembly 110, and the latch assembly 112 are shown.

The exterior assembly 110 is shown to include the electronic circuitry 117 communicatively and electrically connected to the processing unit 116. The exterior assembly 110 includes the keypad 120. In some examples, the exterior assembly 110 includes an optional exterior antenna 130 usable for communication with a remote device and/or an optional camera 131. In some examples, the exterior antenna 130 is utilized by the processing unit 116 to determine where a mobile device is located. However, such a feature is not required, but can add additional security.

In some examples, the camera 131 can be used to monitor the environment adjacent the exterior assembly 110. In some examples, the camera 131 is capable of capturing still photos and/or video media and storing such media locally at the electronic lock 100 and/or in a remote location (i.e., the cloud). In some examples, when a tamper alarm is activated, the camera 131 can be used to simultaneously capture a photo/video of the environment adjacent the exterior assembly 110 to help the owner of the electronic lock 100 determine what (e.g., what person) the tamper alarm is associated with. In some examples, the electronic lock 100 is configured to send the capture from the camera 131 to the remote device 208 when a tamper alarm is activated. An example of an electronic lock with a camera is described in U.S. Patent Publication No. 2014/0267740 for an "ELECTRONIC LOCK WITH REMOTE MONITORING," which is hereby incorporated by reference in its entirety.

As described above, the interior assembly 108 includes the processing unit 116. The interior assembly 108 can also include a motor 132 and an optional interior antenna 134.

As shown, the processing unit 116 includes a processor 136, memory 138, an RF circuit 140, and a battery 142. The processing unit 116 is located within the interior assembly 108 and is capable of operating the electronic lock 100.

In some examples, the processor 136 can analyze whether or not a tampering event exists based on a set of preprogramed instructions (i.e., firmware) stored in the memory 138. In some examples, the processing unit 116 is configured to capture a keypad input event from a user and store the keypad input event in the memory 138. In some examples, the processor 136 analyzes at least one characteristic of the keypad input event to determine if a tampering event exists. In some examples, if the processor 136 determines if a tamper alarm exists, the processor 136 outputs the tamper alarm 204. In some examples, the processor 136 can output the tamper alarm via the RF circuit 140. In some examples, the processor 136 can process signals received from a variety of devices to determine whether the electronic lock 100 should be actuated. In some examples, the processor 136 receives a signal from the exterior antenna 130, interior antenna 134, or other sensor 135 (e.g., a motion sensor (not shown), camera 131, or other sensor) and can validate received signals in order to actuate the electronic lock 100.

The memory 138 can include any of a variety of memory devices, such as using various types of computer-readable or computer storage media. A computer storage medium or computer-readable medium may be any medium that can contain or store the program for use by or in connection with the instruction execution system, apparatus, or device. By way of example, computer storage media may include dynamic random access memory (DRAM) or variants thereof, solid state memory, read-only memory (ROM), electrically erasable programmable ROM, and other types of devices and/or articles of manufacture that store data. Computer storage media generally includes at least one or more tangible media or devices. Computer storage media can, in some examples, include embodiments including entirely non-transitory components.

In some examples, the processing unit 116 can include the RF circuit 140. The RF circuit 140 is capable of providing at least one wireless communication protocol. In some examples, the processing unit 116 can communicate with a remote device via the RF circuit 140. In some examples, the processing unit 116 can communicate with the distributed system 206 via the RF circuit 140. In other examples still, the processing unit 116 can communicate with a remote server via the RF circuit 140. The RF circuit 140 can include one or more wireless communication interfaces, e.g., Bluetooth, Wi-Fi (IEEE 802.11x protocols), or any other wireless communication interface capable of bidirectional wireless communication. In example embodiments, the RF circuit 140 can include a Bluetooth Low Energy (BLE) interface. In another example embodiment, the RF circuit 140 communicates with a router via Wi-Fi. The router may be a standard router connected to a network, located within the building. Alternatively, the RF circuit 140 may communicate with a router through a Zigbee communication protocol. Still further, the RF circuit 140 may communicate with a router through a Bluetooth communication protocol.

The interior assembly 108 also includes the battery 142 to power the electronic lock 100. In one example, the battery 142 may be a standard single-use (disposable) battery. Alternatively, the battery 142 may be rechargeable.

The interior assembly 108 also includes the motor 132 that is capable of actuating the bolt 114. In use, the motor 132 receives an actuation command from the processing unit 116, which causes the motor 132 to actuate the bolt 114 from the locked position to the unlocked position or from the unlocked position to the locked position. In some examples, the motor 132 actuates the bolt 114 to an opposing state. In some examples, the motor 132 receives a specified lock or unlock command, where the motor 132 only actuates the bolt 114 if the bolt 114 is in the correct position. For example, if the door 102 is locked and the motor 132 receives a lock command, then no action is taken. If the door 102 is locked and the motor 132 receives an unlock command, then the motor 132 actuates the bolt 114 to unlock the door 102.

As noted above, the optional interior antenna 134 may also be located in the interior assembly 108. In some examples, the interior antenna 134 is capable of operating together with the exterior antenna 130 to determine the location of the mobile device 208. In some examples, only a mobile device determined to be located on the exterior side 106 of the door 102 is able to unlock (or lock) the door 102. This prevents unauthorized users from being located near the electronic lock 100 and taking advantage of an authorized mobile device that may be located on the interior side 104 of the door 102, even though the authorized mobile device is not being used to unlock the door 102.

In some embodiments, the electronic lock 100 is made of mixed metals and plastic, with engineered cavities to contain electronics and antennas. For example, in some embodiments, the electronic lock utilizes an antenna near the exterior face of the lockset, designed inside the metal body of the lockset itself. The metal body can be engineered to meet strict physical security requirements and also allow an embedded front-facing antenna to propagate RF energy efficiently.

Figure 6:
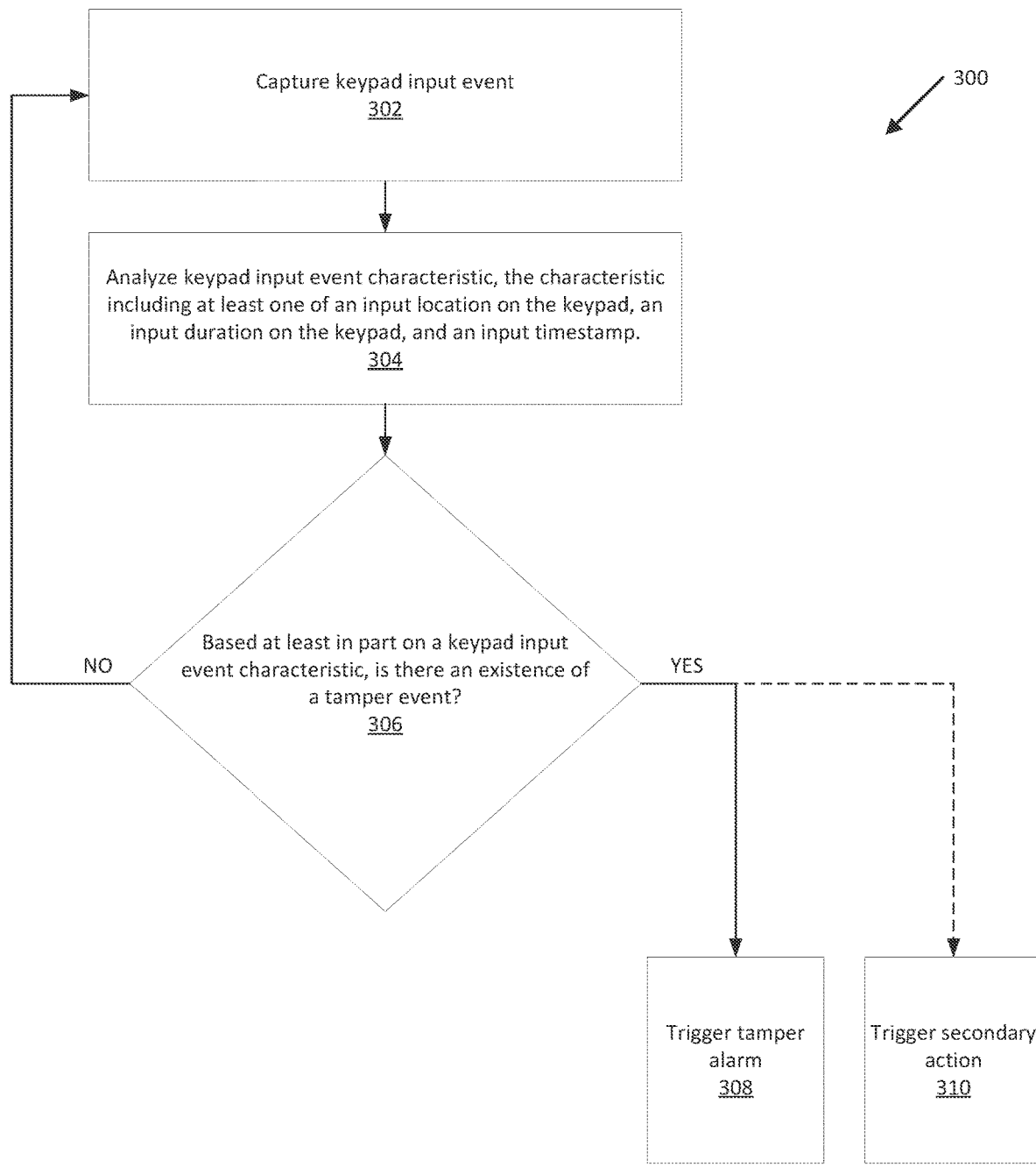
FIG. 6 illustrates an example operation of the electronic lock of FIG. 1.

FIG. 6 shows an example schematic representation of an operation 300 of the electronic lock 100. The electronic lock 100 captures a keypad input event at step 302. In some examples, the keypad input event is stored in the memory 138 of the processing unit 116. In some examples, the keypad input event is stored with a plurality of characteristics associated therewith. The keypad input event characteristics can include, but are not limited to, an input location on the keypad 120, an input duration on the keypad 120, and an input timestamp.

In some examples, every time the user 202 interacts physically with the electronic lock 100, the processing unit 116 stores a new keypad input event. In some examples, when the user 202 inputs an access code that contains four digits, the electronic lock 100 can capture four keypad input events. In other examples, the processing unit 116 can group such an access code entry action together as a single stored keypad input event that contains a plurality of keypad input sub-events. In some examples, the electronic lock captures a keypad input event every time an input is detected. For example, each keypad input event stored can include the following characteristics [location of the input; duration of the input; and time of the input]. An example keypad input event can be ["character 5"; "1 second"; "2018-06-02 08:02:30"]. Another example of a keypad input event can be [("character 1"; "1 second"; "2018-06-02 08:02:30"); ("upper right corner"; "4 seconds"; "2018-06-02 08:02:32"); ("character 5"; "1 second"; "2018-06-02 08:02:40"]); (["character 9"; "1 second"; "2018-06-02 08:02:45"]; ["character 0"; "1 second"; "2018-06-02 08:02:50"].

The input location on the keypad 120 can be, for example, where the user 202 makes contact with a particular character 126 on the keypad 120. For example, the input location of a keypad input event is a single character 126 (e.g., a "button" of the keypad). This indicates where the user 202 makes contact with the keypad 120. In some examples, the input location on the keypad 120 is not associated with a particular character 126 of the keypad 120. In some examples, the processing unit 116 can monitor input to areas of the keypad 120 that are not associated with characters 126 (i.e., boundary areas between characters, the edges of the keypad 120, etc.).

The input duration on the keypad 120 can be, for example, how long the user 202 makes contact with the keypad 120. For example, the input duration can be how long the user 202 make contact with a character 126 (i.e., presses a particular "button") of the keypad 120.

The time of the input on the keypad 120 can be, for example, a timestamp associated when a particular input is first sensed. In some examples, the timestamp can be in the format of 'YYYY-MM-DD H:MM:SS.'

The electronic lock 100 can be configured to store a plurality of historic keypad input events in the memory 138 of the processing unit 116. In some examples, a sliding window is employed to determine the amount of keypad input events to store in the memory 138. In some examples, the electronic lock 100 stores the keypad input events from a certain amount of historical days, for example, the last 30 days. In other examples, the electronic lock 100 stores a particular number of past keypad input events, for example, the last 200 keypad input events, regardless of when they occurred. In some examples, the amount of historical keypad input events that the electronic lock 100 stores can be altered based on the preference of the manufacturer of the electronic lock 100, the size of the memory 138, and/or preference of the user 202.

Once the keypad input event is captured from the keypad 120 at step 302, the keypad input event is analyzed at step 304. In some examples, the processing unit 116, specifically the processor 136, analyzes the keypad input event. In other examples, the processing unit 116 transmits the keypad input event via the RF circuit 140 for remote analysis. In some examples, the analysis can be performed by the mobile device 208. In other examples, the analysis can be performed by the distributed system 206.

The analysis of the keypad input event can include, but is not limited to, comparing the keypad input event to past keypad input events, comparing the keypad input event to predetermined tampering event characteristics, and/or comparing the keypad input event to learned tampering event characteristics.

In some examples, the past historical input events are analyzed to create a normal use profile. The normal use profile can include information based off the historical keypad input events that indicate patterns in the usage of the electronic lock 100. For example, a normal use profile might include information that the user 202 shows a pattern of using the electronic lock 100 around 8:00 AM and around 5:30 PM every weekday. In other examples, a normal use profile might include information that the user 202 has a normal input duration of no more than two seconds. In some examples, the user can manually alter the normal use profile, regardless of historical input events.

In some examples, the electronic lock can be programmed to include information regarding predetermined tampering event characteristics. For example, a characteristic indicative of a tampering event is an input duration of more than five seconds. In another example, a characteristic indicative of a tampering event is an input time between the hours of 12:00 AM and 5:00 AM. In another example still, a characteristic indicative of a tampering event is an input location on the corners and/or edges of the keypad 120. In some examples, the processing unit 116 is configured to be updated with tamper alarm characteristics via the RF circuit (e.g., a definition and/or firmware update).

In some examples, the distributed system 206 can aggregate keypad input events from a single user or a plurality of users and utilize machine learning to produce learned tampering event characteristics. In some examples, users can provide an indication to the distributed system 206 that a particular keypad input event actually resulted in tampering.

At step 306, based at least in part on a keypad input event characteristic, the electronic lock 100 determines if there has been a tampering event. If there has not been a tampering event, the electronic lock 100 performs no action and continues to operate as normal.

If the keypad input event does not match the normal use profile, and/or includes characteristics that match with the predetermined tamper characteristic and/or the learned tampering event characteristics, the processing unit 116 determines that a tampering event exists. Once there is a known existence of a tampering event, the processing unit 116 triggers the tamper alarm 204 at step 308. In some examples, the processing unit 116 triggers a secondary action at step 310 in place of, or in addition to, the tamper alarm 204 if there is an existence of a tampering event. In some examples, the secondary action can include, but is not limited to, disabling the operation of the keypad 120, disabling the operation of the electronic lock 100, and/or notifying an external system (i.e., an alarm system).

In some examples, the user 202 can alter the sensitivity of the tendency of processing unit 116 to trigger the tamper alarm 204. In some examples, the user 202 can selectively disable the processing unit 116's ability to trigger the tamper alarm 204. In some examples, the user 202 can alter the processing unit 116's tendency to trigger the tamper alarm 204 between a variety of predetermined sensitivity levels. In some examples, the user 202 can alter the sensitivity of the processing unit 116 to trigger the tamper alarm 204 via the mobile device 208 in communication with the RF circuit 140 of the processing unit 116. In some examples, the user 202 can alter the sensitivity of the processing unit 116 to trigger the tamper alarm 204 via a physical switch (not shown) located on the interior assembly 108 of the electronic lock 100.

In some examples, when setting the sensitivity level at its highest setting, the processing unit 116 will trigger the tamper alarm 204 if the keypad input event does not match with high accuracy the normal use profile. In some examples, when setting the sensitivity level at its highest setting, the processing unit 116 will trigger the tamper alarm 204 if the keypad input event includes a single characteristic that matches a predetermined and/or learned tampering event characteristic. When the user 202 reduces the sensitivity, the processing unit 116 requires, for example, a less accurate match to the normal use profile and allows more than one characteristic to match a predetermined and learned tampering event characteristic.

Figure 7:
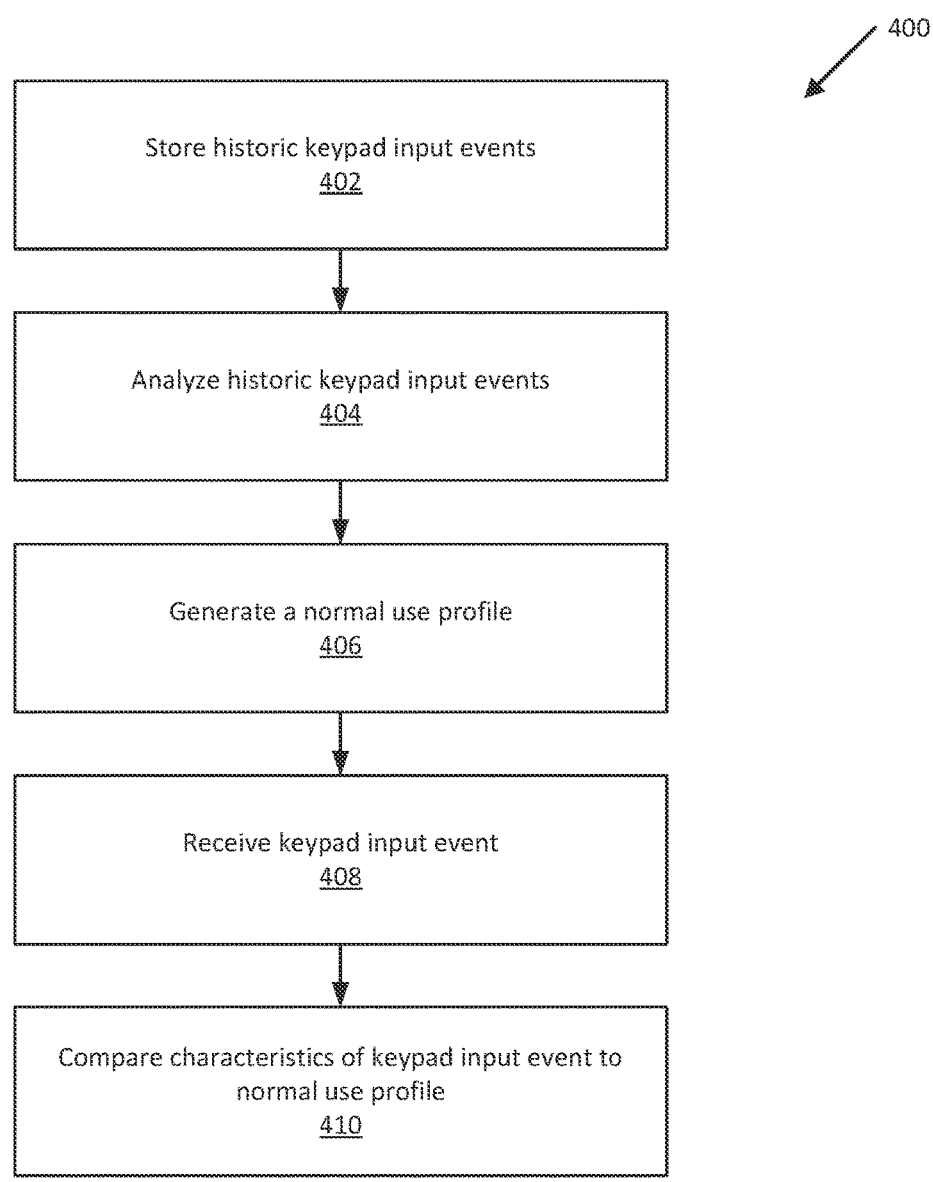
FIG. 7 illustrates another example operation of the electronic lock of FIG. 1.

FIG. 7 depicts an example operation 400 of the electronic lock 100. The operation 400 depicts the creation of the normal use profile. At step 402, the electronic lock 100 stores historic keypad input events. As mentioned above, the historic keypad input events can be stored in the memory 138 and/or remote from the electronic lock 100, such as on the mobile device 208 or the distributed system 206.

At step 404, the historic keypad input events are analyzed. In some examples, the processor 136 of the processing unit 116 analyzes the historic keypad input data for trends. In some examples, the processing unit 116 utilizes a mathematical function to analyze the characteristics of the historic keypad input events. In some examples, the processing unit 116 analyzes the data by utilizing a mean, median, mode, or other similar mathematical function to analyze the trends in the historic keypad inputs. Other analyses can be utilized as well.

At step 406, the normal use profile is generated by the processing unit 116. As noted above, the normal use profile can include information indicating how the electronic lock 100 is normally interacted with. The normal use profile can vary widely based on the where the electronic lock 100 is installed. For example, the normal use profile of a single individual where the electronic lock is installed on a non-main entry door will likely be much different from the normal use profile of a family where the electronic lock is installed on a main entry door.

At step 408, the processing unit 116 receives a keypad input event at the keypad 120 and, at step 410, a comparison is made between the keypad input event received at the keypad 120 and the normal use profile.

Figure 8:
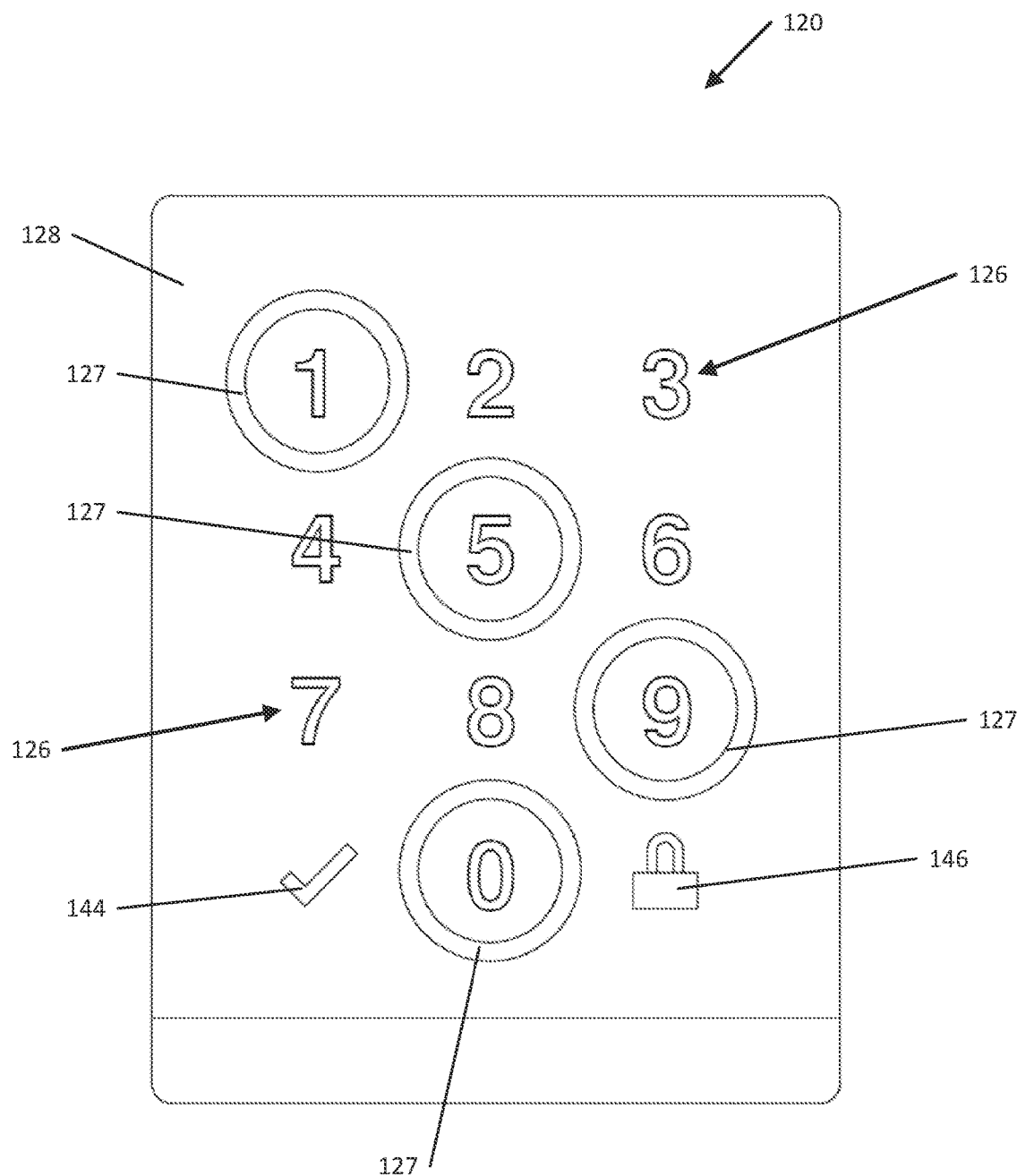
FIG. 8 illustrates an example keypad input event of the electronic lock of FIG. 1.

FIG. 8 shows the keypad 120 including the touch interface 128 displaying a plurality of characters 126. In the depicted example, the keypad 120 is a ten-digit numeric keypad with a confirmation key 144 and a lock key 146. Each character 126 corresponds to a number (i.e., a button) on the keypad 120. As shown, the four characters 126 are encircled. The encircled characters indicate valid input locations 127 that correspond to a valid access code of "1590." This means that the user 202 must interact with the "1" character, followed by the "5" character, followed by the "9" character, followed by the "0" character. The valid input locations 127 indicate input locations from the user 202 on the touch interface 128 of the keypad 120. The processing unit 116 can store this order of valid input locations and can compare any input location on the keypad 120 to the valid input locations. In some examples, an inaccurate input location compared to the valid input location can indicate the existence of a tampering event.

Figure 9:
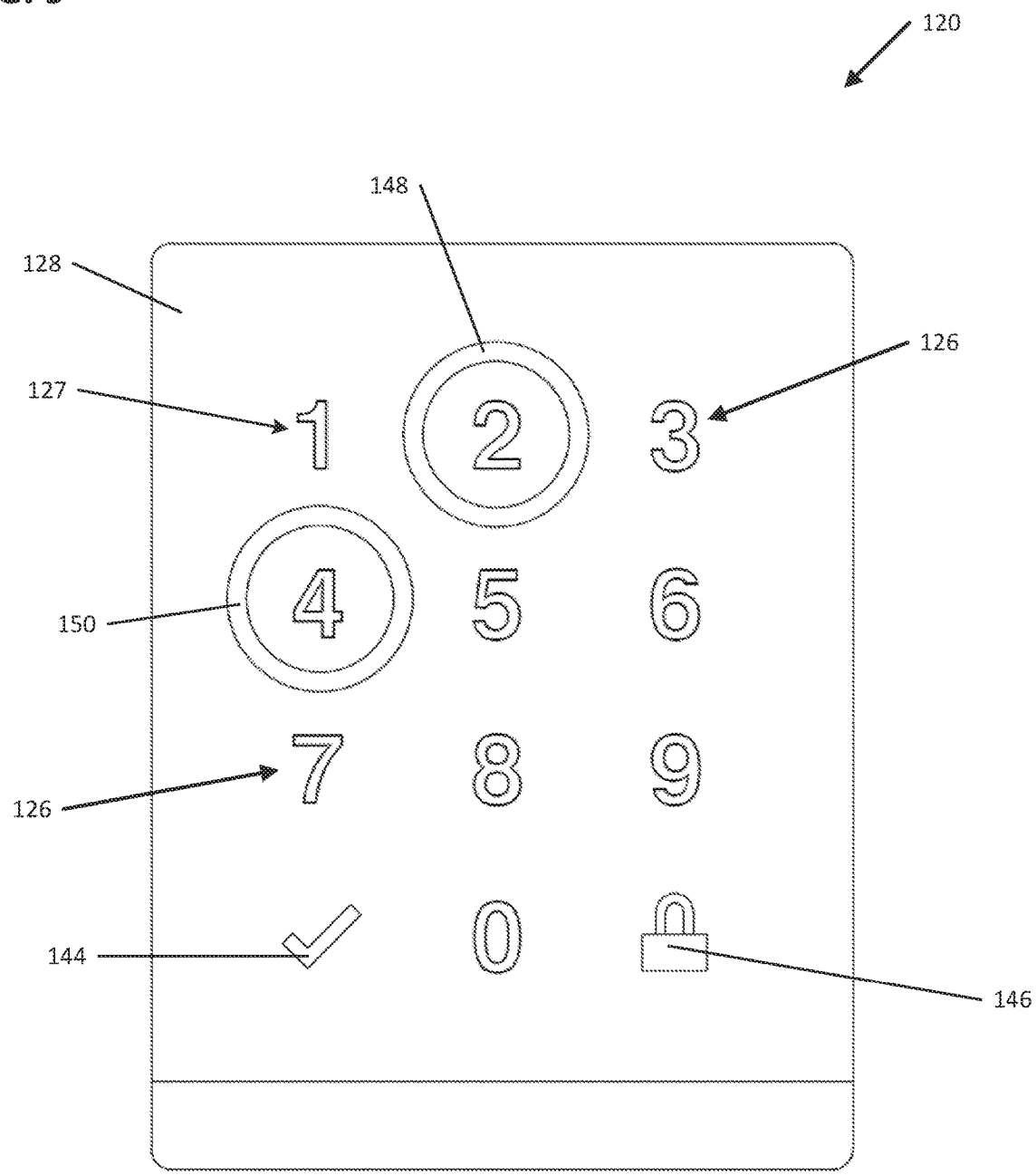
FIG. 9 illustrates another example keypad input event of the electronic lock of FIG. 1.

FIG. 9 depicts an example keypad input event. Specifically, FIG. 9 shows a keypad input event when the user 202 first interacts with the keypad 120, prior to any other input. As noted with respect to FIG. 8, the valid access code is "1590", so the first valid input location 127 should be the character "1." However, an input location 148 on keypad 120 is shown to be around character "2." Further, a secondary input location 150 on the keypad 120 is shown to be around character "4." Character "2" and character "4" both are positioned immediately adjacent the valid input location 127 of character "1." In some examples, the keypad input events created by each input location 148, 150, immediately adjacent the valid character "1," are considered normal keypad input events by the processing unit 116 of the electronic lock 100. Therefore, the processing unit 116 would not indicate a tampering event if it received keypad input events having the input locations 148, 150 when the valid input location is "1." In some examples, contact with immediately adjacent characters 126 to the valid character 126 is permitted as the user can commonly miss-contact the keypad 120 under normal permitted usage, thus such use would not indicate tampering. In some examples, the processing unit 116 can be preprogrammed to not indicate a tampering event if an input location is immediately adjacent a valid input location. However, in some examples, if a keypad input event occurs with an input location that is not immediately adjacent the valid input location, the processing unit 116 can indicate the existence of a tampering event. For example, if an input location on the character "5" or "7" was received as a keypad input event, the processing unit 116 would indicate the existence of a tampering event and, in some examples, trigger the tamper alarm 204.

In some examples, the processing unit 116's sensitivity to the input location characteristic of a keypad input event can be customized by the user 202. In some examples, the processing unit 116 can be programmed to be less sensitive, thereby permitting less accurate input locations from the valid input location without indicating a tampering event. In other examples, the processing unit 116 can be programmed to be more sensitive, thereby indicating the existence of a tampering event when a keypad input event occurs with an input location that is any input location but the valid input location.

As described above, a timestamp characteristic can be associated with each keypad input event, specifically the input location. The timestamp can correspond with when the user 202 makes contact with the keypad 120. In some examples, the processing unit 116 can be programmed to indicate the existence of a tampering event if the keypad input event includes a particular timestamp. In some examples, the processing unit 116 can be programmed to indicate the existence of a tampering event if the keypad input event includes a timestamp that indicates a keypad input event occurs during the night. In some examples, the processing unit 116 can be programmed to indicate the existence of a tampering event if the keypad input event includes a timestamp that indicates a keypad input event occurs during the day (e.g., when the user is away from the electronic lock at work).

Figure 10:
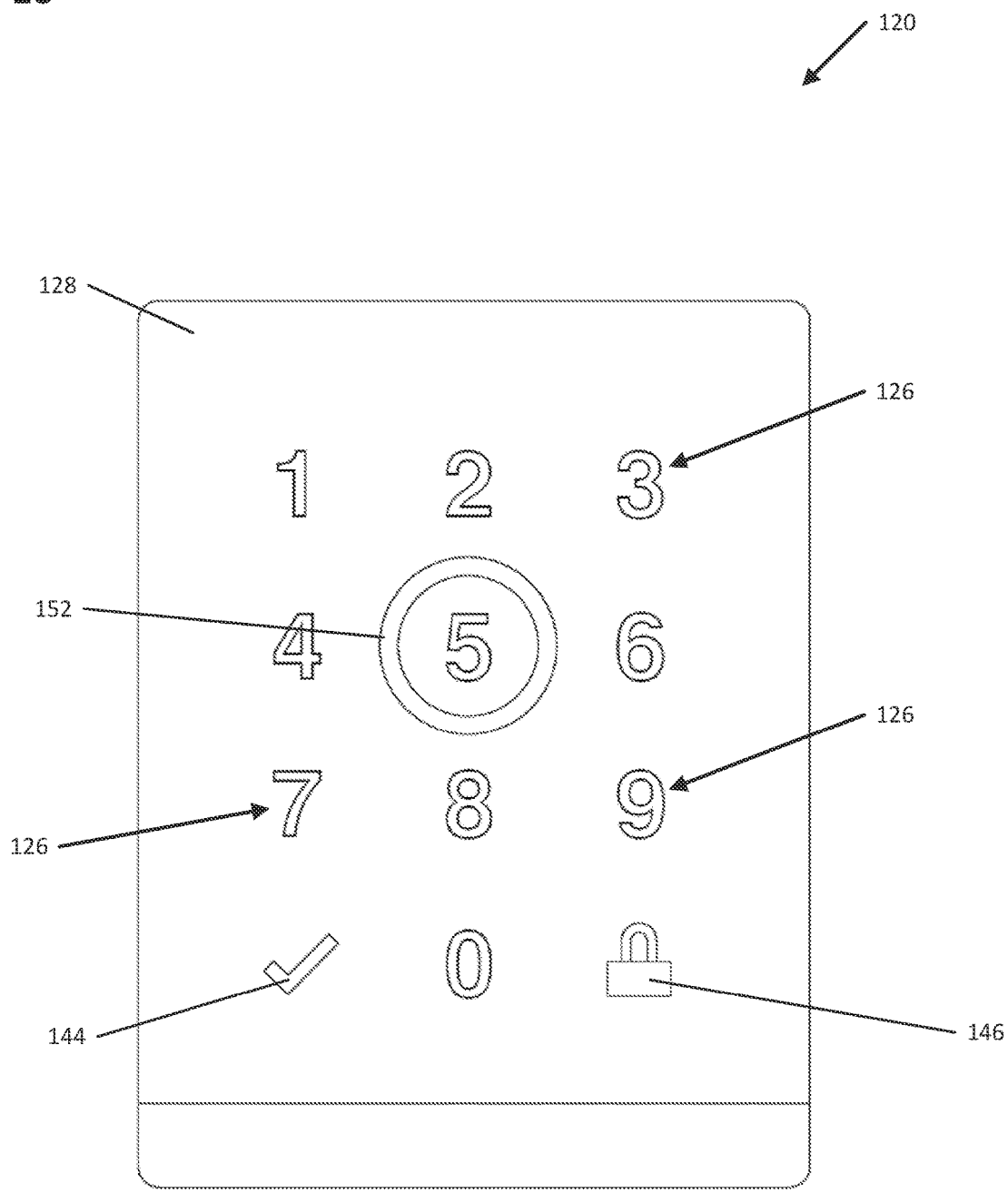
FIG. 10 illustrates another example keypad input event of the electronic lock of FIG. 1.

FIG. 10 depicts an input location 152 around the character "5." In some examples, extended contact with the touch interface 128 of the keypad 120, regardless of input location, can be indicative of a tampering event. For example, a user may attempt to drill out, pry open, or otherwise damage the keypad 120 to compromise the electronic lock 100 to gain access through the door 102. In the depicted example, the input duration around character "5" is a time that is indicative of a tampering event. In some examples, the processing unit 116 can be preprogrammed to indicate the existence of a tampering event if an input duration exceeds two seconds. In some examples, the processing unit 116 can be preprogrammed to indicate the existence of a tampering event if an input duration exceeds three seconds. In some examples, the processing unit 116 can be preprogrammed to indicate the existence of a tampering event if an input duration exceeds four seconds. In some examples, the processing unit 116 can be preprogrammed to indicate the existence of a tampering event if an input duration exceeds five seconds. In some examples, the processing unit 116 can create a normal input duration in the normal use profile based on historic keypad input events.

In addition to the above keypad input events, or events occurring on the keypad, in example embodiments, other types of input events may be detectable as tampering events. For example, in some embodiments, an electrical continuity sensor may be included in the exterior assembly 110, which is broken in the event of an electrical discontinuity detected in the exterior assembly 110. For example, such an electrical discontinuity may occur in response to an exterior escutcheon being removed, or a circuit board within the exterior circuitry 117 being drilled into or broken. In such instances, a signal may be sent, or detected, via electrical cable 115, causing the processor 136 to detect a tampering event.

Figure 11:
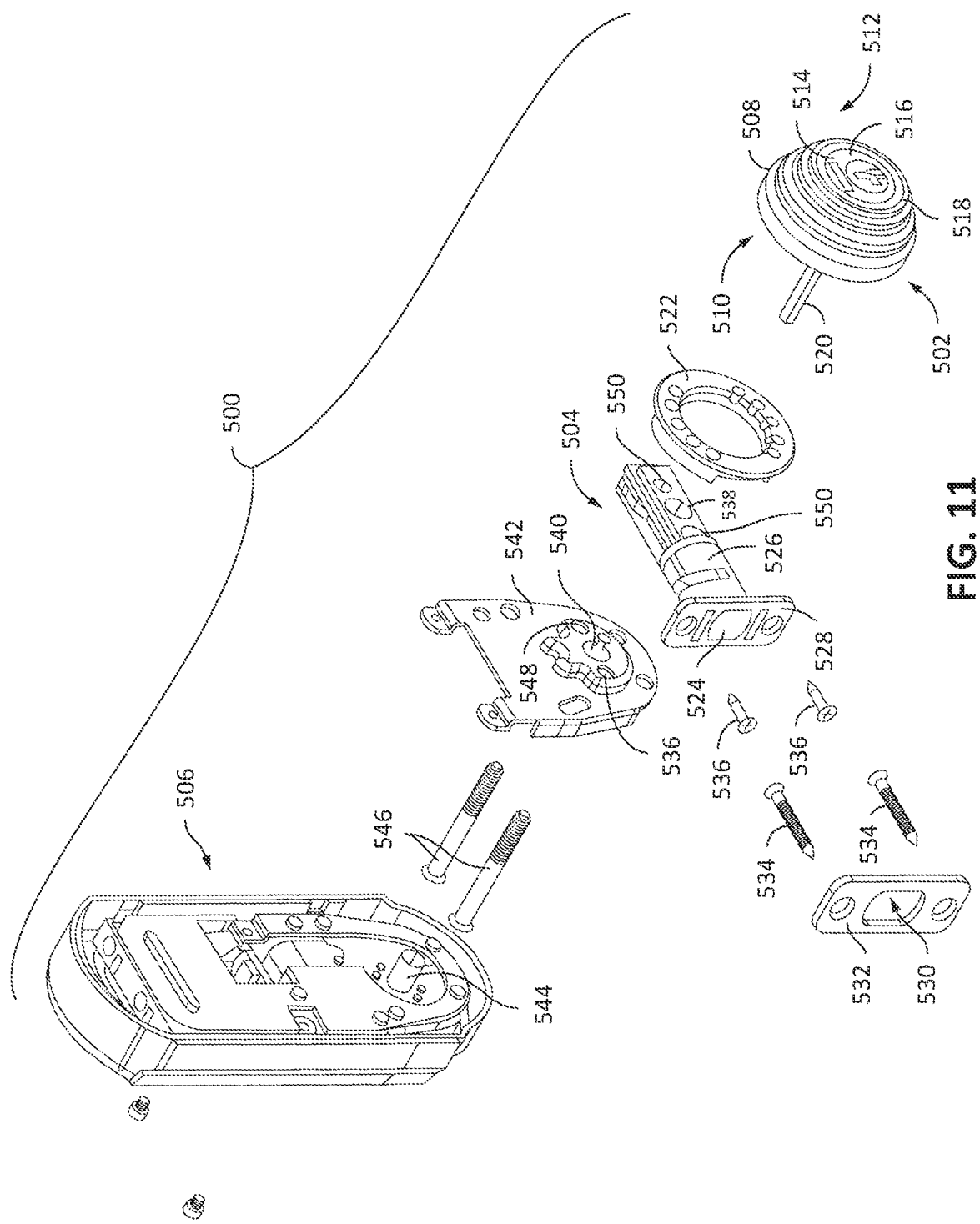
FIG. 11 illustrates a schematic exploded view of an electronic lock according to an alternative embodiment of the present disclosure.
Figure 12:
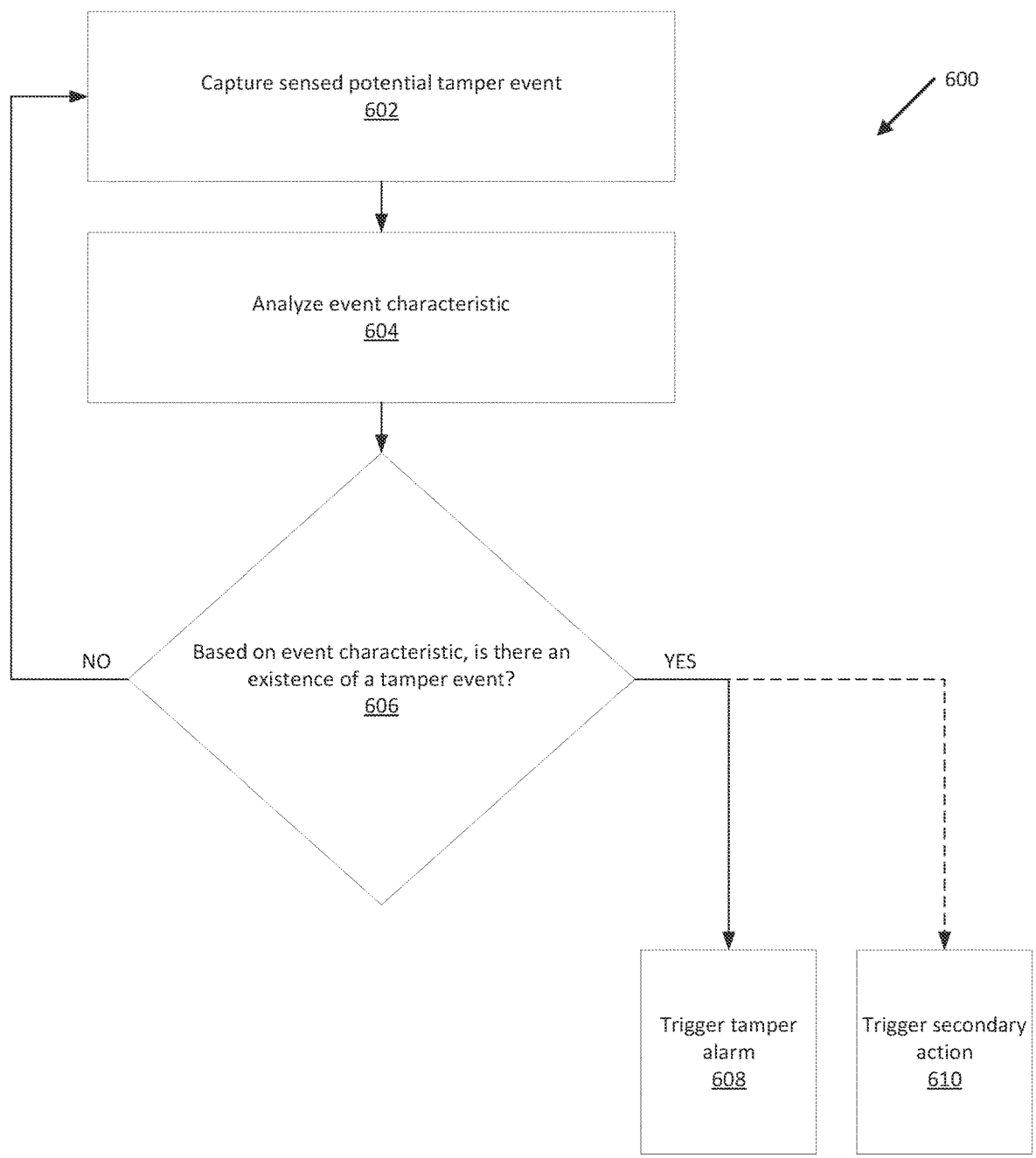
FIG. 12 illustrates an example operation of the electronic locks of FIG. 1 and FIG. 11.

Referring now to FIGS. 11-12, further example embodiments of an electronic lock are depicted which are configurable to detect tampering events.

FIG. 11 shows an example electronic lock 500 according to a further embodiment of the disclosure. In the example shown, the electronic lock 500 includes an exterior assembly 502, a latch assembly 504, and an interior assembly 506. Typically, the exterior assembly 502 is mounted on the outside of a door, while the interior assembly 506 is mounted inside a door.

Generally, the example electronic lock 500 lacks an exterior keypad, as seen in electronic lock 100. However, the electronic lock 500 will generally include the exterior assembly 502 which may detect tampering events. In the example shown, the exterior assembly 502 is in the form of a deadbolt. As discussed above, however, this disclosure is not intended to be limited to only an electronic deadbolt, but encompasses any kind of electronic lock. As shown, the exterior assembly 502 includes a cylinder guard cover 508 that houses internal components of the exterior assembly 502. In the example shown, the cylinder guard cover 508 has a decorative shape with a rear portion 510 that would be adjacent a door (not shown) and a front portion 512 extending from the door. In this example, the cylinder guard cover 508 has a tapered shape from the rear portion 510 to the front portion 512, but the exterior assembly 502 and cylinder guard 508 could have a wide variety of different sizes and shapes depending on the particular circumstances.

In the embodiment shown, the front portion 512 of the exterior assembly 502 includes a front cover 514 that surrounds a mechanical lock assembly 516. A mechanical key (not shown) may be inserted into the mechanical lock assembly 516 to mechanically unlock the electronic lock 500.

In the embodiment shown, a light communication device 518 surrounds the front cover 514. In this example, the light communication device 518 is formed in the shape of a ring surrounding the front cover 514 and mechanical lock assembly 516. However, the light communication device 518 could be formed in other shapes or positioned differently on the exterior assembly 502.

In some embodiments, the electronic lock 500 may be touch activated. For example, the electronic lock 500 may use capacitive sensing to determine whether the user wants to actuate the electronic lock 500. The touch surface for capacitive sensing to actuate the electronic lock 500 could be any external surface, including but not limited to, a cylinder guard cover, cylinder guard, keyway, handle, rose, or other exterior surface of the electronic lock 500. In the example shown, the exterior assembly 502 uses capacitive sensing to determine when a user touches the cylinder guard cover 508. Accordingly, in the embodiment shown, the user is able to touch anywhere on the cylinder guard cover 508 to lock or unlock the lock assembly 500, or otherwise activate various functions of the electronic lock 500.

In the example shown, the exterior lock assembly 502 has a torque blade 520 extending from the rear portion 510. The torque blade extends through an adaptor 522 in the embodiment shown, which is received within a bore in a door to which the electronic lock 500 is being installed or mounted.

The latch assembly 504 is disposed in a core in a door and may be actuated manually by the mechanical lock assembly 516, or electronically by touching anywhere on the cylinder guard cover 508 (in the embodiment shown) to extend/retract a bolt 524. The bolt 524 moves linearly in and out of a sleeve 526. When the bolt 524 is retracted, an end of the bolt 524 is generally flush with a base plate 528. When the bolt 524 is extended, the bolt 524 protrudes through an edge bore in the door into an opening 530 of a strike plate 532, which is positioned in a jamb adjacent the door. As is typical, the strike plate 532 is attached to the jamb using fasteners 534. Likewise, fasteners 536 attach the base plate 528 of the latch assembly 504 to a door.

In the embodiment shown, the latch assembly 504 includes a spindle 538 that is drivable in a first direction to extend the bolt 524 and a second direction to retract the bolt 524. The spindle 538 is configured to receive the torque blade 520 such that rotation of the torque blade 520 in a first direction retracts the bolt 524; whereas, rotation of the torque blade 520 in the opposite direction causes the spindle to retract the bolt 524.

The torque blade 520 extends through the latch assembly 504 into an opening 540 in a mounting plate 542, which is attached to an interior side of a door. The torque blade 520 passes through the opening 540 and is received by a spindle driver 544. The spindle driver 544 provides electronic control of the bolt 524, such as using a motor to rotate the spindle driver 544 in either a first direction or in a second direction. Since the torque blade 520 is disposed within the spindle 538, rotation of the spindle driver 544 may be used to extend and/or retract the bolt 524 of the latch assembly 504. In the embodiment shown, fasteners 546 extend through holes 548 in the mounting plate, which are aligned with openings 550 in the latch assembly 504. A wiring harness (not shown) electrically connects electronics between the exterior assembly 502 and the interior assembly 506. Example electronic components included within the exterior assembly 502 and the interior assembly 506 generally can include those as described above in conjunction with FIG. 5, except that in this embodiment, keypad 120 may optionally be excluded, and a capacitive touch sensor or other continuity sensor may be included within exterior circuitry 117. Accordingly, in various embodiments, the keypad 120, or a capacitive touch sensor, or a continuity sensor associated with or included within an exterior assembly 502 of an electronic lock, may be referred to herein as a tamper sensing device.

Additional details regarding such a further alternative electronic lock into which a tamper alarm may be integrated are provided in U.S. Pat. No. 9,024,759, entitled "WIRELESS LOCKSET WITH INTEGRATED ANTENNA, TOUCH ACTIVATION, AND LIGHT COMMUNICATION METHOD", the disclosure of which is hereby incorporated by reference in its entirety.

Referring to FIG. 12, a method 600 is shown for detecting a tampering event using any of a variety of electronic locks, including those shown in aspects of the present disclosure.

In general, at 602, the method 600 includes capturing a sensed potential tamper event. The sensed potential tamper event can be any of a variety of types of events as discussed above, such as a keypad event, a discontinuity event, a disassembly event (e.g., removal or damage of an escutcheon), or other types of events experienced by an exterior assembly of the electronic lock.

In the example shown, at 604, an event characteristic is analyzed. In some instances, such as in the case of experiencing a drilling occurrence or other electrical discontinuity, the event characteristic may by definition correspond to a tamper event. In other cases, such as a wrong key code being pressed on a keypad, or other types of mis-typed codes (e.g., in terms of which sequence is selected and in what duration), a tamper event may be detected by comparison to a normal usage characteristic. Accordingly, the specific input event or input type (e.g., drilling, prying, or other damage attempt causing discontinuity, or alternatively, a duration, location, or timestamp of input from a keypad) can correspond to a tampering event according to a particular characteristic of an input event defined as being a tampering event.

At operation 606, depending on the type of potential tamper event and optionally how that event compares to either normal operation or to known tamper events, a tamper alarm may be triggered (at 608) or a secondary action (at 610) may be taken, analogous to those actions as discussed above in connection with FIG. 6.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

The invention claimed is:

1. An electronic lock comprising:
a latch assembly including a bolt movable between an extended position and a retracted position;
a keypad for receiving a keypad input event; and
a processing unit configured to control movement of the bolt between the extended position and the retracted position responsive to receiving a valid keypad input event, wherein the processing unit is configured to capture the keypad input event;
wherein, based at least in part on a characteristic of the keypad input event, the processing unit detects and indicates if a tampering event exists, wherein the characteristic includes at least one of an input location on the keypad, an input duration on the keypad, and an input timestamp; and
wherein the processing unit detects the tampering event by comparing the input duration on the keypad to an acceptable input duration value, the acceptable input duration value based, at least in part, on a normal use profile created based on analysis of historic keypad input events that indicate patterns during a plurality of authorized actuations of the electronic lock.

2. The electronic lock of claim 1, wherein the processing unit detects the tampering event when the input duration on the keypad exceeds the acceptable input duration value.

3. The electronic lock of claim 1, wherein the processing unit includes a processor and a memory, wherein the processing unit stores the keypad input event in the memory, and wherein the processor compares at least one characteristic of the keypad input event to the normal use profile stored in the memory, the normal use profile containing characteristics of historic keypad input events, the characteristics being determined based on patterns in the usage of the electronic lock.

4. The electronic lock of claim 3, wherein the processing unit determines the tampering event exists if the at least one characteristic of the keypad input event does not match the known use profile.

5. The electronic lock of claim 1, wherein the processing unit detects the tampering event by comparing the input location on the keypad to an acceptable input location, wherein if the input location on the keypad does not match the acceptable input location, the processing unit indicates that the tampering event exists.

6. The electronic lock of claim 5, wherein the acceptable input location is based, at least in part, on the valid keypad input event.

7. The electronic lock of claim 1, wherein the historic keypad input events include keypad input events from a predetermined number of historical days.

8. The electronic lock of claim 1, wherein the processing unit communicates the keypad input event with a distributed computing network, wherein the processing unit determines if the tampering event exists based at least in part on a received indication of the tampering event from the distributed computing network.

9. The electronic lock of claim 8, wherein the distributed computing network compares at least one characteristic of the keypad input event to at least one known characteristic of a keypad input event indicative of the tampering event, wherein the at least one known characteristic of the keypad input event indicative of the tampering event is maintained remotely from the electronic lock.

10. The electronic lock of claim 9, wherein the at least one characteristic of the keypad input event indicative of the tampering event is generated based on an aggregate of keypad input events.

11. The electronic lock of claim 1, wherein the processing unit activates a tamper alarm if the tampering event is detected and outputs the tamper alarm to a remote device, and wherein the remote device is a mobile device.

12. The electronic lock of claim 1, wherein the processing unit renders the keypad inoperable if the tampering event is detected.

13. A method of operating an electronic lock, comprising:
receiving a keypad input event via a keypad, wherein upon receipt of a valid keypad input event, a bolt is moved between an extended position and a retracted position;
detecting a tampering event based at least in part on a characteristic of the keypad input event, wherein the characteristic includes at least one of an input location on the keypad, input duration on the keypad, and an input timestamp, the tampering event being determined to exist by comparing the input duration on the keypad to an acceptable input duration value, wherein the acceptable input duration value is based, at least in part, on a normal use profile created based on analysis of historic keypad input events that indicate patterns during a plurality of authorized actuations of the electronic lock; and
activating a tamper alarm to indicate the tampering event if the input duration on the keypad exceeds the acceptable input duration value.

14. The method of claim 13, further comprising outputting the tamper alarm from the electronic lock via a wireless communication unit.

15. The method of claim 13, further comprising rendering the keypad inoperable if the tampering event is detected.

16. The method of claim 13, wherein the historic keypad input events include a predetermined number of keypad events that occurred most recently.

17. The method of claim 13, further comprising:
communicating the keypad input event with a distributed computing network;
receiving a tampering event indication from the distributed computing network; and
activating the tamper alarm based at least in part on the tampering event indication.

18. The method of claim 13, further comprising:
comparing at least one characteristic of the keypad input event to at least one known characteristic of a keypad input event indicative of the tampering event, wherein the at least one known characteristic of the keypad input event indicative of the tampering event is maintained remotely from the electronic lock.

19. The method of claim 18, wherein the at least one characteristic of the keypad input event indicative of the tampering event is generated based on an aggregate of keypad input events.

20. An electronic lock comprising:
- a latch assembly including a bolt movable between an extended position and a retracted position;
- an exterior assembly including a tamper sensing device; and
- a processing unit configured to control movement of the bolt between the extended position and the retracted position responsive to receiving a valid input at a user input device;
- wherein the processing unit is configured to capture an input event; and
- wherein, based at least in part on a characteristic of the input event, the processing unit detects and indicates if a tampering event exists, wherein the characteristic includes at least one of an input type, an input location, an input duration, and an input timestamp on the tamper sensing device, the tampering event being determined to exist by comparing the input duration to an acceptable input duration value, the acceptable input duration value based, at least in part, on a normal use profile created based on analysis of historic input events that indicate patterns during a plurality of authorized actuations of the electronic lock.

* * * * *